March 26, 1963 R. F. SHANNON 3,083,167
MANUFACTURE AND STABILIZATION OF COLLOIDAL SILICIC ACID
Filed May 5, 1955 4 Sheets-Sheet 2

INVENTOR.
RICHARD F. SHANNON
BY
ATTORNEYS

March 26, 1963  R. F. SHANNON  3,083,167
MANUFACTURE AND STABILIZATION OF COLLOIDAL SILICIC ACID
Filed May 5, 1955  4 Sheets-Sheet 4

FIG.13

TITRATION CURVES OF CATION EXCHANGER FUNCTIONAL GROUPS
A. PHENOLIC-OH  C. CARBOXYL-COOH
B. METHYLENE SULFONIC-$CH_2SO_3H$  D, E. NUCLEAR-$SO_3H$

FIG.14

TITRATION CURVES OF SEVERAL CATION EXCHANGE RESINS
USING A 0.5 NORMAL SOLUTION OF SODIUM HYDROXIDE
A. AMBERLITE IR 120
B. DOWEX 50-X8
C. AMBERLITE IRC-50
MILLIEQUIVALENTS OF SODIUM
HYDROXIDE PER GRAM RESIN

INVENTOR.
RICHARD F. SHANNON
BY
ATTORNEYS

United States Patent Office 3,083,167
Patented Mar. 26, 1963

3,083,167
MANUFACTURE AND STABILIZATION OF COLLOIDAL SILICIC ACID
Richard F. Shannon, Lancaster, Ohio, assignor to Owens-Corning Fiberglas Corporation, a corporation of Delaware
Filed May 5, 1955, Ser. No. 506,197
6 Claims. (Cl. 252—313)

This application is a continuation-in-part of my application filed August 9, 1954, and now abandoned, having Serial Number 448,587.

This invention relates to methods and apparatus for producing highly reactive colloidal solutions of inorganic oxides and particularly to such methods for producing colloidal silicic acid involving ion exchange reactions either in batch or cyclic processes.

It is an object of this invention to provide improved methods of preparing colloidal solutions of inorganic oxides.

It is an object of this invention to provide a method of preparing aqueous colloidal silicic acid sols.

It is a further object to provide a recyclic ion exchange process for such purposes and a means of maintaining the ion exchange resin in an efficient form.

It is a further object to provide methods and apparatus for producing directly high concentration colloidal solutions of silica.

It is an object likewise to provide stabilizers for colloidal silicic acid, which stabilizers will materially increase the storage life of colloidal silicic acid.

In the past, commercially available sodium silicate solution which is diluted to provide a solution having about 3% of $SiO_2$ has been passed through an ion exchange column to provide a product having from 3 to 3½% silica content. In order to reduce the amount of liquid in the product, it has been found necessary in the past to evaporate the total effluent to provide a silica content in the final product of from 6 to 6½%.

In the past, acid regenerative steps have been used to treat the ion exchange resin such as noncarbonaceous or carbonaceous zeolite. The regeneration of the ion exchange resin has been a process which was difficult to control and even under the best of conditions, it has been found that the generally accepted resins became less and less effective as sodium ion removers as the resins were used over and over again even though acid regenerative steps were included in the process.

Bird's U.S. Patent 2,244,325 and Iler's U.S. Patent 2,631,134 state that it is desirable to have the presence of alkali for the purposes of stabilizing the silicic acid sols. It is suggested in these patents that the securing of the sols is established by assuring the presence of free alkali such as sodium silicate in order to provide a hydrogen ion or pH value in the sols of 8 or greater. Bird suggests an alkalinity of 60 to 75 grains per gallon calculated as calcium carbonate which is the equivalent of an 0.08% to 0.1% sodium hydroxide solution. The amount of alkalinity required has also been stated as being a ratio of metallic cations or sodium oxide to silica of 50:1 to 100:1. Iler sets forth that such sols are of a hydrogen ion value or pH value of from 8 to 10½.

In the use of base exchange resins in forming silicic acid sols from silicate salt solutions, it has been customary to pass the salt solutions to be treated through resin in such quantities that the entire capacity of the resin in absorbing sodium or other cations was utilized. By using such methods, alkaline reacting sols are produced. Voorhees in U.S. Patent 2,457,971 produces an alkaline silicic acid sol directly by the use of an ammoniated resin.

It has been taught that silicic acid sols are very unstable at a hydrogen ion value or pH range of from 4 to 8 and that by adding acid to alkaline sols rapid gelling occurs when the pH values of from 4 to 8 result.

The present invention provides method and apparatus for producing silicic acid sols by an exchange wherein the sol produced is strongly acid being of a hydrogen ion value of 4 or less. All prior attempts to produce such acidic silicic acid sols have been unsuccessful as described by Iler in U.S. Patent 2,650,200, issued August 25, 1953, due to gelation difficulties in the effluent sol and in the hydrogen ion exchange resin bed. Gelation results in blocking of the resin bed and loss in efficiency of the ion exchange resin bed.

The invention comprises a treatment of an aqueous silicic acid salt sol of an inorganic alkali metal silicate such as sodium silicate or potassium silicate or other water soluble silicate salt with a hydrogen ion exchange resin characterized by having thereon strong acid residues or attached acid radicals. Such attached acid radicals on the reactive surface of the resin may be strong acid methylene sulfonic or aryl sulfonic acid residues or the like. The amount of silicic acid salt sol used is such that not all of the strong acid residues are saturated with cations. The amount of silicic acid salt sol is also insufficient to saturate other weak acid residues which are present. Since such strong acid or sulfonic acid residues or the like ionize readily to provide strongly acid aqueous solutions, it is possible to produce silicic acid sols in a quite stable range of acidity as long as the strong acid residues in the ion exchange resin are not completely utilized. The excess strong acid residues also cause the alkali silicate solutions to change from the alkaline side to the acid side and pass through the unstable pH range of from 4 to 8 very rapidly before any appreciable gelation occurs.

The invention may be carried out in either a batch or a cyclic operation and the partial utilization of the resin is secured in quite a simple manner. If a batch operation is to be utilized, the resin is dispersed in water and a silicate solution added slowly with stirring. The amount of silicate is restricted to a total cation content which is less than that which the resin can absorb. The amount of silicate solution added depends upon the total quantity of various acid groups or residues available on the ion exchange resin. The silicate solution is added so that about 85% or up to about 98% of the acid groups are utilized. This may be accomplished by stopping the addition of silicate solution to the resin water mix as soon as the pH starts to go higher than 4. Since the invention comprises contacting a hydrogen ion exchange resin with an aqueous silicic acid salt sol in a restricted amount so that all the acid residues available are not saturated with cations available in the silicic acid salt sol, it is not at all necessary to have any prior knowledge of the chemical composition of a given resin or its actual total combining power in regard to cations since the partial utilization of the ion exchange resin is maintained by careful check of the pH of the resulting mixture.

The cyclic process involving introduction of silicic acid salt sol through a bed of hydrogen ion resin involves the selection of a proper resin which will provide an effluent having a desired low hydrogen ion value, i.e., pH of 4 or less. The invention comprises contacting a hydrogen ion exchange resin with an aqueous silicic acid salt sol in a controlled amount so that not all of the acid residues available on the resin are saturated by the total cations available in the silicic acid salt sol. The amount of saturation is controlled by determining the pH of the resulting mixture and by not allowing the hydrogen ion value to become greater than about 4.

In the process comprising passing an aqueous silicic acid salt sol through a bed of hydrogen ion resin, it is not easy to determine pH while the silicic acid salt sol is being passed through the resin bed, therefore, the completeness of the saturation of the acid residues on the resin is controlled as follows. When using a suitable resin as an ion exchange material, an effluent having a desired low hydrogen ion value of substantially 4 or less is obtained. Using such a resin in an ion exchange column, a zone is formed between the incoming alkaline solution which contains some silicate salt and the strongly acid silicic acid sol being formed within the column. This zone represents a boundary in which all the very strong acid groups are substantially saturated with cations. This zone passes downwardly through the column as the resin and its strong acid groups become progressively more saturated with cations from the silicate salt solution. In order to prevent the complete saturation of the acid groups within the resin bed, the zone level is not permitted to reach the bottom of the resin bed surface. By so doing, the hydrogen ion value of the effluent never becomes greater than 4 and setting up of the resin bed within the column is prevented. The zone may be referred to as a neutral gel zone. The resin within this moving zone does not gel into a solid mass and the neutral gel is removed by a subsequent caustic backwash.

The present invention provides a method and apparatus which is highly efficient and can be used repeatedly with no practical limitation to its life span due to the failing of the ion exchange resin, and, furthermore, this invention provides a regenerative step for the ion exchange resin which makes it possible for the resin to operate at its peak efficiency throughout its life span. The apparatus and methods likewise make it possible to handle high concentration silicic acid salt sols and as a result provide a product of high concentration only formerly producible by including subsequent evaporation steps.

The selection of the proper ion exchange resin or cation exchange resin is an important aspect of this invention, regardless of whether the process is to be carried out as a batch method with the silicic acid salt sol and resin being mixed together or whether the process is to be carried out in an ion exchange column wherein the silicic acid salt sol is poured through the resin bed. Not all hydrogen ion resins are useful in the processes since some provide acid solutions of greater than a pH of 4 at the very start of their use. This is especially true of resins having only weak acid residues or organic radical groups attached thereto.

The invention will be better understood by reference to the drawings in which.

The apparatus of this invention comprises mixing tanks for the raw materials, one or more ion exchange columns, and evaporators and a gas scrubber for recovering acid. The ion exchange columns 16, 16 comprise a cylindrical column in which is disposed a screen 22 upon which glass particles 23 and ion exchange resin 17 are supported. The ion exchange column has inlet valves 19, 19 and an overflow gutter 26. Retractable screen 14 is adapted for insertion into the ion exchange column 16, see FIGURES 2 to 12. At the bottom of the ion exchange column is a baffle 33 which is disposed over opening 34 and lower valve 35.

To illustrate the invention, actual operating conditions will be described with reference to the production of colloidal silicic acid; however, the invention is not to be limited thereto. In one embodiment of the invention commercial grade sodium silicate having a weight ratio of 1 part $Na_2O$ to 3.3 parts $SiO_2$ and an average solids content of 37.3% is used as the starting material. The specific gravity of this material is 40° to 41.2° Baumé, 1.381 to 1.397. A 10% solution of sodium silicate is prepared by adding a suitable amount of water to the commercially available sodium silicate having a solids content of 37.3%. The specific gravity of the 10% solution used as the influent is 1.089 at a temperature of from 50° to 55° F.

Sodium silicate is not a single compound, but rather a mixture of several compounds dispersed in one another and may be referred to as a solid colloidal dispersion. Sodium silicate partially ionizes and it is known that the sodium cations are available to exchange with other ions, which exchange actually takes place in an ion exchange column.

Briefly then, the sodium silicate is directed into an ion exchange column wherein a resin such as a high density cation type, nuclear sulfonic acid ion exchanger is in the form of attrition-resistant bead like particles. The sodium ions in the sodium silicate solution are collected by the ion exchange resin and hydrogen ions are given up by the ion exchange resin.

After the resin within the column is nearly exhausted, but not completely exhausted, water is introduced into the column. The resin is back washed with caustic to remove any colloidal silicic acid gel which has not been removed by the forward washing of the resin bed with water. This caustic back washing is an important step of the process which makes it possible to operate very efficiently an ion exchange column repeatedly and for extended lengths of time.

The caustic and contaminants are removed by backward flushing with water. The resin is then regenerated with an acid. Preferably, the product is stabilized by adding materials which provide both sodium and ammonium ions. For instance, in FIGURE 1, 16% sodium hydroxide and 28% ammonium hydroxide are premixed with water in tanks 27, 27 and added to the colloidal silicic acid in tanks 28, 28.

Figure 1:
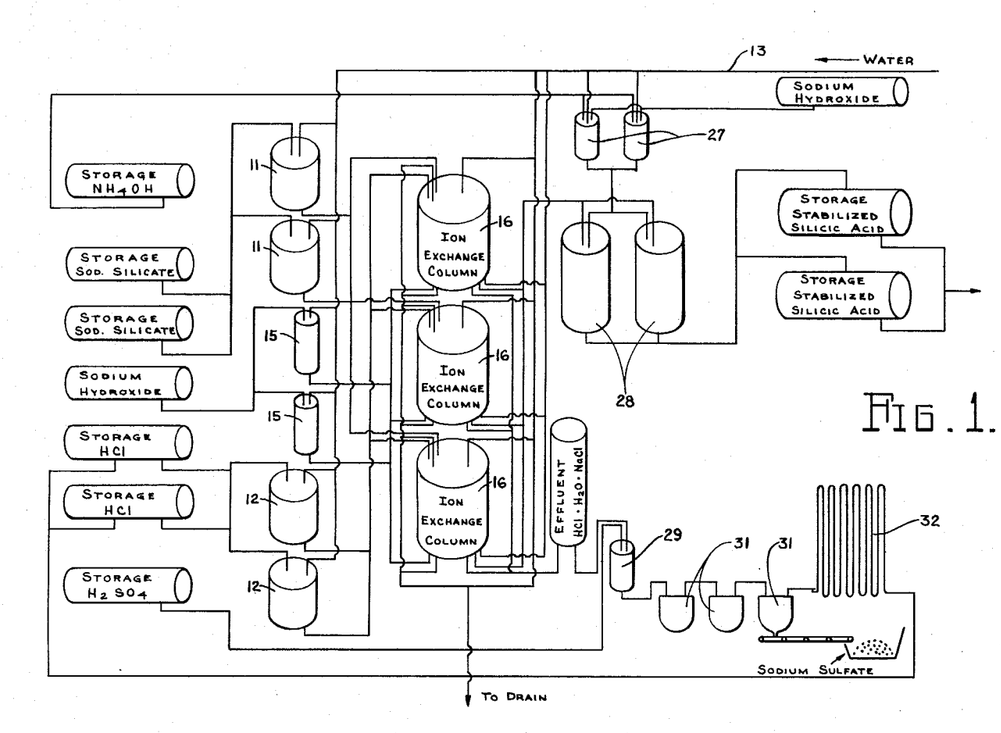
FIGURE 1 is a flow sheet of the process used in carrying out one embodiment of the invention.

More specifically, the apparatus shown in the drawings is operated as follows. The starting materials are stored in tanks as indicated in FIGURE 1. Sodium silicate solution having 10% solids and a specific gravity of 1.089 at a temperature of from 50° to 55° F. is mixed in containers 11, 11 by adding water from inlet 13 to sodium silicate having an average solids content of 37.3% as supplied. A 10% solution of hydrochloric acid is prepared in mixing tanks 12, 12 by adding water to 22° Baumé hydrochloric acid. 5% sodium hydroxide is prepared by diluting 50% sodium hydroxide with water in mixing tanks 15, 15. The water provided through inlet 13 is preferably substantially free of contaminants since the exchange capacity of the resin may be unduly influenced by water having high proportions of contaminants.

In practicing the invention, it should be understood that the water supply used for diluting the soluble silicate salts will have some influence in that sulfate and chloride impurities in the water will find their way to the final product as sulfuric acid and hydrochloric acid. The presence of small traces of these acids is not found to be harmful but does result in a lowering of the pH or hydrogen ion values in the silicic acid products.

Figure 2:
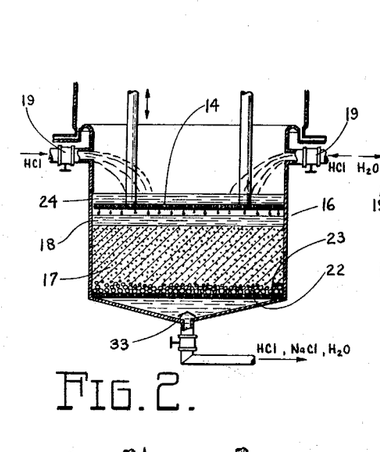
FIGURE 2 is a view of an ion exchange column showing the first step of the process, namely, acid regeneration.

Ion exchange columns 16, 16 are partially filled with an ion exchange resin 17 as shown in FIGURE 2. The resin is preferably one such as that designated Amberlite IR-120 or an equivalent material Dowex 50-X8, which is a high density cationic type, nuclear sulfonic acid ion exchanger in the form of attrition-resistant, bead like particles. Both of these resins are manufactured in accordance with D'Alelio U.S. Patent 2,366,007 and are sulfonated vinyl benzene cross-linked with divinyl benzene. Dowex 50-X8 is one of a series of ion exchange materials offered by Dow Chemical Company, the members of the series varying in the degree (2% to 12%) of divinyl benzene cross-linking. Dowex 50-X8 is sulfonated polystyrene (vinyl benzene) cross-linked with 8% of divinyl benzene. When charging the ion exchange columns 16, 16, a screen 22 of an acid and alkali resistant material is positioned at the bottom of the column to provide a base, and then glass particles 23 of the proper size are introduced to build up a bed upon which the resin particles lie. The particles of glass are of three sizes: (1) less than 8 mesh but more than 4 mesh; (2) less than 16 mesh but more than 8 mesh; and (3) less than 30 mesh but more than 16 mesh. Equal volumes of each are used to make up the bed with the larger particles being on the bottom and the smaller particles on top. The size of the glass particles has been exaggerated to indicate the classification of the glass particles obtained by introducing the glass particles at the top of a column which is already filled with water. Such a bed of glass particles provides an excellent foundation for supporting the ion exchange resin particles 17, which are introduced upon the glass particles.

After the columns 16, 16 are properly charged and the raw materials are prepared in the proper strengths, the process is carried out in a cycle comprising the following basic steps:

(1) Regeneration, FIGURE 2;
(2) Forward wash (water), FIGURE 3;
(3) Backward wash (water) and reclassification of resin particles, FIGURES 4, 5 and 6;
(4) Exhaustion, FIGURE 7;
(5) Forward wash (water), FIGURE 8;
(6) Backward wash (caustic), FIGURE 9; and
(7) Backward wash (water) and reclassification of resin particles, FIGURES 10, 11 and 12.

In FIGURE 2 is shown the regeneration step of the cycle which has been arbitrarily chosen as step 1. A 10% solution of hydrochloric acid is introduced into the ion exchange columns 16, 16 from mixing tanks 12, 12, see FIGURE 1. Hydrochloric acid is introduced upon retractable screen 14 through which it trickles and then the acid mixes with the water in water layer 18 which is left on top of the ion exchange resin 17 after the draining of the backward wash water, see FIGURE 12. Hydrochloric acid is added at a sufficient rate to maintain a slight head 24 of hydrochloric acid upon retractable screen 14. Sufficient hydrochloric acid is added until the sodium content (determined as $Na_2O$) of the effluent coming from the ion exchange column 16 is $9 \times 10^{-5}$ grams per milliliter of solution as determined by a flame photometer. It has been found that removal of about 98% of the sodium contained in the resin is sufficient for the purposes of this invention. The effluent comprises water, hydrochloric acid and sodium chloride, the sodium chloride being formed by the reaction of the hydrochloric acid and the sodium ions on the resin particles.

Figure 3:
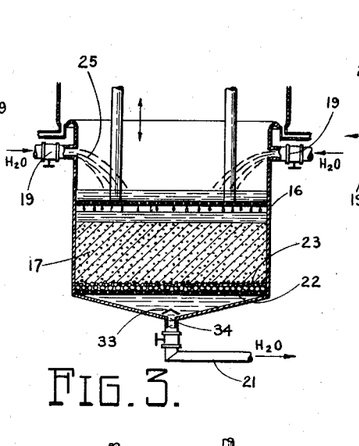
FIGURE 3 is a view of the second step or forward wash step.

The next step in the process is a forward washing with water to remove the residual anion from the column. This is done by introduction of water in the form of a spray upon retractable screen 14 through which it trickles and passes downwardly through the ion exchange resin 17 picking up chloride ions when hydrochloric acid has been used as the regenerative acid. The passing of the water is maintained until the concentration of the chloride ion in the effluent is no greater than in the rinse water 25 being introduced.

Figure 4:
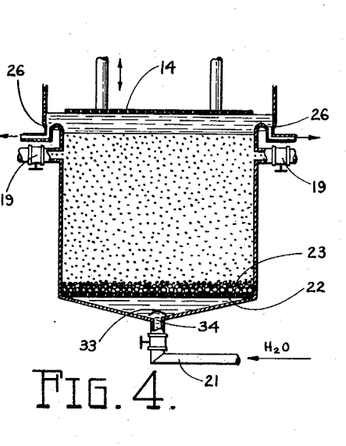
FIGURE 4 is a view of the third step wherein the backward wash expands the resin within the column.
Figure 5:
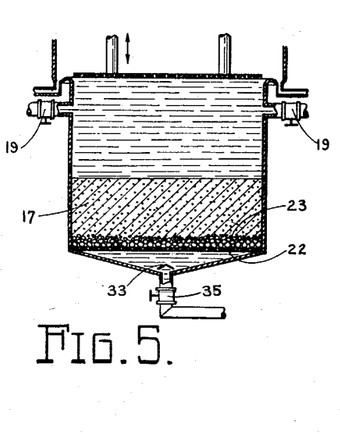
FIGURE 5 is a view of part two of the backward wash step.
Figure 6:
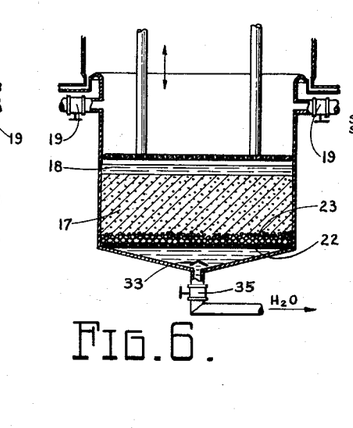
FIGURE 6 is a view of part three of the backward wash step, the water being drained downwardly.

Step 3 of the process is a backward wash with water and an expansion and reclassification of the ion exchange resin 17, see FIGURES 4, 5 and 6. Since the regenerating acid and the rinse water of steps 1 and 2 are applied by forward flow, the resin particles tend to pack tightly in the column. This packing down of the resin bed reduces the flow rate of the solution through the column and also increases the probability that the resin bed will tend to freeze as will be discussed later when the exhaustion step is described. In step 3, water is introduced under pressure through lower line 21 located at the bottom of the ion exchange columns 16, 16 in sufficient volume to expand the bed of resin approximately 60%, see FIGURE 4. Baffle 33 over opening 34 prevents any substantial displacement of the glass particles 23 and ion exchange resin 17. Inlet valves 19, 19 are closed before the backward washing step is commenced and the resin and water level rises as indicated in FIGURE 4 to a level which is short of that at which the resin will overflow into gutters 26, 26 of the ion exchange columns 16, 16. When the resin and water level has risen to the position shown in FIGURE 4, the water is shut off and the ion exchange resin 17 is allowed to settle downwardly without any removal of water from the ion exchange column 16. The resin settles downwardly to its original height, see FIGURE 5, and then in the third part of the backward wash step, see FIGURE 6, the water is drained from the bottom of the column slowly until the water head above the resin is materially diminished, only a shallow layer of water 18 remaining above the resin bed. It is greatly preferred to allow the resin particles to settle before the water is removed from the bottom of the column. By so doing, reclassification of the resinous particles takes place and complete loosening of the resin bed occurs.

Figure 7:
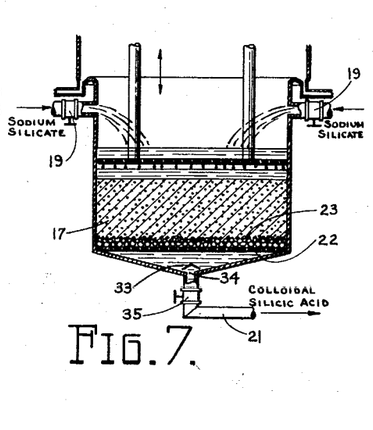
FIGURE 7 is a view of the fourth or exhaustion step of the process.

The exhaustion step, for which all other steps of the process are carried out, is shown in FIGURE 7 wherein the 10% solids sodium silicate solution is introduced from containers 11, 11 into the ion exchange columns 16, 16. As the sodium silicate solution, which is at least partially ionized, passes downwardly through ion exchange resin 17, the sodium ions of the sodium silicate solution are exchanged for the hydrogen ions contained in the exchange resin. The water layer 18 remaining above the ion exchange resin is reduced to a minimum depth in the last part of the backward wash step in order to minimize the dilution which would normally take place when the first sodium silicate is added to the column. If the sodium silicate is diluted, the strength of the silicic acid produced at the start of the exhaustion step is likewise reduced by dilution. It is generally preferred to have a shallow layer of water over the ion exchange resin to reduce the disturbance of the resin by the sodium silicate solution being introduced into the column. Retractable screen 14 helps assure that no substantial disturbance of the resin particles takes place with possible attendant channelling of the solution through the ion exchange resin. The proper positioning of the retractable screen above the uppermost resin particles and above the water layer 18 makes the screen more effective in this respect.

It has been discovered that if the ion exchange resin is completely exhausted, i.e., all of the hydrogen ions have been exchanged for sodium ions, the danger of the resin becoming coated with a neutral gel which cannot be removed by washing becomes much more pronounced. The resin bed is exhausted first at the top and then the line between totally exhausted resin and partially exhausted resin moves downwardly until the entire resin in the bed has given up all its hydrogen ions and taken on all of the sodium ions it can possibly take on. While the exhaustion of the resin particles is taking place, a neutral gel zone is formed in the column at the interface between the sodium silicate which is coming into the column at a high pH and the silicic acid being formed below this incoming sodium silicate, the silicic acid having a low pH. This zone at the interface between the sodium silicate and silicic acid moves downwardly as the column progressively becomes more nearly exhausted. The colloidal silicic acid reacts at the interface with the sodium silicate to form a neutral gel. As the gel passes downwardly through the resin bed, it coats the resin particles nd finally the gel may freeze all the resinous particles together. If this occurs, complete cleaning of the column becomes necessary and a fresh start with new or reconditioned ion exchange resin particles is required.

Figure 8:
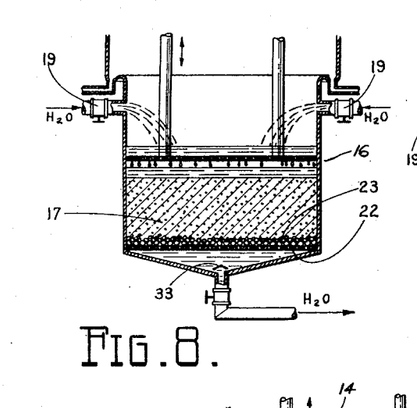
FIGURE 8 is a view of the fifth or forward washing step.

In order to prevent freezing of the column by the neutral gel formed at the interface between the sodium silicate and the silicic acid, it has been found that it is preferred to pass about 98% or less of the theoretical amount of sodium silicate through the regenerated resin and then the exhaustion step is stopped and is immediately followed by a water rinsing step such as that illustrated in FIGURE 8. It is preferred to pass 95% or less of the theoretical amount of sodium silicate through the resin.

The advantage in using reduced amounts of alkali silicates in the column is that the columns are prevented from setting up or freezing up and gelation does not occur in the silicic acid effluent. Prior processes which produced an acid effluent failed to recognize the critical nature of this exhaustion step and the difficulties of blocking the column and gelling the product. By feeding to the column amounts of alkali silicate which are less than that required to completely exhaust the ion exchange resin, none of the hot ring phenomena as described occurs and the column remains free and not stopped up by gelation.

The theoretical amount of sodium silicate to be used was determined by flowing a 10% solution of silicate of soda through an ion exchange column containing a known volume of resin. All of the effluent containing colloidal silicic acid was collected and weighed, evaporated to dryness and reweighed. The total capacity of the column was calculated and it was determined that 640 grams of silicic acid solids are produced by a column containing 245.63 cubic inches of acid regenerated ion exchange resin. The combination of (1) passing only 95% or less of the theoretical amount of sodium silicate through the column, and (2) washing immediately with a forward wash of water eliminates entirely the possibility of the damaging neutral gel forming with the attendant freezing of the resin particles into a mass.

The forward washing step is preferably combined with the exhaustion step; the introduction of sodium silicate is stopped and the introduction of water is immediately begun, see FIGURE 8. It is desirable to allow the sodium silicate solution above the resin bed to reduce to a minimum head before the rinse water is added; however, the rinse water should immediately follow the introduction of the last sodium silicate solution. The head of the sodium silicate solution is allowed to be reduced in order to prevent undue dilution of the last portion of sodium silicate solution and likewise a dilution of the last of the colloidal silicic acid produced.

The forward washing of the resin bed, as shown in FIGURE 8, removes the water soluble contaminants; however, many of the resin particles are still heavily coated with colloidal silicic acid gel which is very difficult to remove. Although the gel coating does not cause an immediate freezing of the column, it does gradually build up, and if the gel is not completely removed each time, the efficiency of the acid regeneration of the resin bed will drop cycle by cycle until the exchange capacity is very seriously affected, and, in fact, will ultimately be reduced to the point where the capacity is not sufficient to take care of the sodium silicate being introduced into the column.

Figure 9:
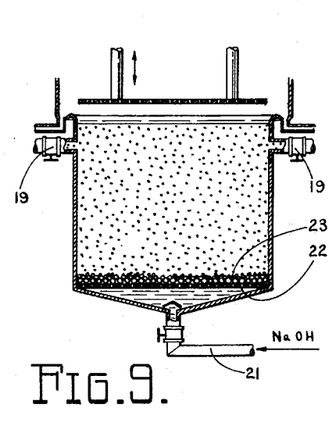
FIGURE 9 is a view of the sixth or backward washing step with caustic.

In order to insure complete removal of the colloidal silicic acid gel, the entire resin bed is soaked with 5% sodium hydroxide in step 6, see FIGURE 9. The caustic is introduced through lower line 21 into the ion exchange column 16 and is allowed to remain in the column for a five minute soaking period.

Figure 10:
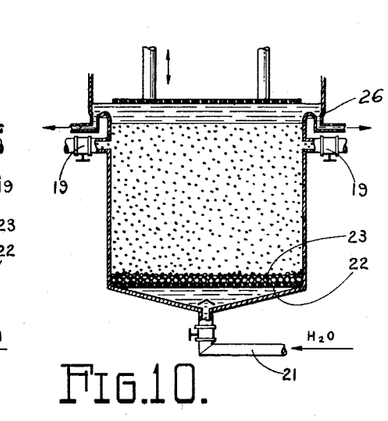
FIGURE 10 is a view of the seventh or backward washing step with water.
Figure 11:
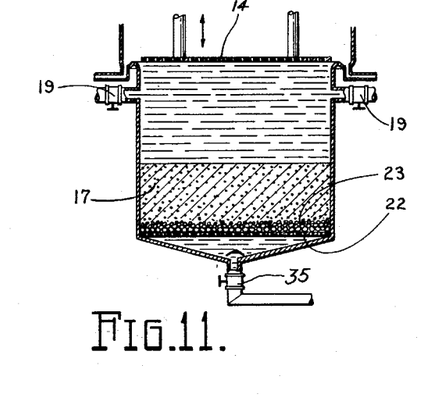
FIGURE 11 is a view of part two of the backward washing step of FIGURE 10, the resin starting to settle downwardly.
Figure 12:
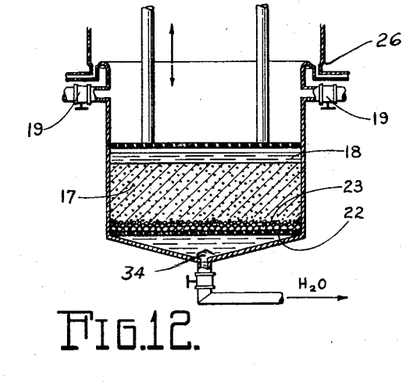
FIGURE 12 is a view of part three of the backward washing step of FIGURE 10, the water being drained downwardly from the column the resin having already settled.

As shown in FIGURES 10, 11 and 12, a backward wash with water and a reclassification of the resin then takes place. The contaminants and the caustic solution itself are removed from the resin bed by introducing water into the column through lower line 21 at the bottom of the column. After the resin bed is expanded 60% and the contaminants removed by continued flushing, the water is cut off and the resin is allowed to settle as is shown in FIGURE 11. After the resin bed is settled to its former level, the water is removed from the column carefully and the cycle is complete.

Using a 10% solids solution of silicate of soda, the process above described produces colloidal silicic acid solution having more than 8% solids by weight. If desirable, the colloidal silicic acid may be stabilized by adjusting the pH from its 2 to 3 pH to a pH of from 9 to 10 so that it passes through the unstable 4 to 8 pH range very rapidly. Either sodium hydroxide or sodium silicate is added to the product to start the reduction in pH and to provide the sodium ions used to stabilize the silicic acid. It has been found preferable not to add more than 1% of sodium ions, i.e., the ratio of sodium ions to silicic acid should not be greater than 1 to 100, in products which are to be used with materials that are subject to alkali attack. Such is the case when the colloidal silica is used as a binder for fibrous glass or other glass products.

The addition of only 1% sodium ions as sodium hydroxide or sodium silicate is insufficient to adjust the pH of the colloidal silicic acid solution to the 8 to 11 range, therefore 28% ammonium hydroxide solution is also added as required. Three parts of ammonia ($NH_3$) per 100 parts of colloidal silicic acid is usually sufficient to adjust the pH to the preferred range of from 8.8 to 10.5. Other compounds including the organic amines may be added in addition to the sodium and/or ammonium ions as a stabilizing solution for the colloidal silicic acid.

The product stabilized with one part sodium either from sodium hydroxide or from sodium silicate and three parts of ammonia to 100 parts colloidal silicic acid provides a product which may be stored in a closed container at room temperature without danger of gelling for six months to a year or more. When the stabilized colloidal silicic acid is stored at 42° F. in a closed container, its shelf life is measured in months rather than in weeks. A closed container is desirable to reduce water and ammonia vaporization.

Stabilization of colloidal silicic acid is achieved by addition of ammonia alone (as ammonium hydroxide) or preferably by addition of sodium and ammonium ions. For instance, by adding ammonium hydroxide in sufficient quantity to obtain 5 parts by weight of ammonia per 100 parts by weight of colloidal silicic acid, a stable colloidal silicic acid product is obtained. By the addition of more than 3 parts of ammonia per 100 parts of colloidal silicic acid, a stable product is achieved while a product with no sodium ions and 3 parts or less of ammonia is unstable. Ammonia, when used as the sole stabilizer, may be added to obtain from 4 to 12 or more parts of ammonia per 100 parts of colloidal silicic acid.

Adding more than 12 parts of ammonia does not materially alter the pH nor improve the stability.

If alkali attack is not a problem, sodium may be added as sodium hydroxide or sodium silicate in sufficient proportions to provide even more than 1 part of sodium per 100 parts of colloidal silicic acid. Sodium is added in sufficient amount to obtain from about 1 to 4 or more parts of sodium per 100 parts of silicic acid along with sufficient ammonium hydroxide to obtain the desired pH of from 8 to 11. When using from 1 to 4 parts of sodium, from 1 to 12 parts of ammonia are added per 100 parts of colloidal silicic acid. The following are examples of stable colloidal silicic acid products with proportions of stabilizing ions and resulting pH being given.

| Colloidal Silicic Acid, parts by weight | Na(NaOH) | $NH_3(NH_4OH)$ | pH |
|---|---|---|---|
| 100 | 0 | 5 | 8.8 |
| 100 | 0 | 11 | 10.1 |
| 100 | 1 | 1 | 9.1 |
| 100 | 1 | 11 | 10.4 |
| 100 | 2 | 1 | 9.6 |
| 100 | 2 | 11 | 10.5 |
| 100 | 3 | 1 | 9.1 |
| 100 | 3 | 11 | 10.4 |

The stabilization with sodium added as sodium silicate instead of sodium hydroxide and ammonia in the same proportions as in the above table provides products having substantially the same pH and stability. The addition of sodium as sodium silicate has the attendant advantage of increasing the silica content.

The colloidal silicic acid is especially adapted as a binder for fibrous glass products either alone or in admixture with a suitable resin, urea borate, clay or the like. Likewise, a fibrous glass product bonded with phenolic resin is treated with silicic acid to provide unusual non-punking and high temperature resistance properties.

Although the regeneration of the ion exchange resin was described as being carried out with hydrochloric acid, it should be understood that other inorganic acids may be used. For instance, dilute sulfuric acid may be used as the regenerating acid. This acid is used to regenerate the resin by continuing the introduction of the from 2 to 10% sulfuric acid solution until the sodium content ($Na_2O$) of the effluent drops to $9 \times 10^{-5}$ grams per milliliter of solution as determined by a flame photometer. Using this end point is desirable since 90% of the theoretical sodium ions are removed. The last 2% of the ions are difficult to remove and it is not really necessary to effect absolute removal of all sodium ions. Forward flow of the regenerative acid has been found to be preferred over backward flow; however, backward flow may be used, if desired.

When using hydrochloric acid as the regenerant, it is possible to reduce costs since by-products are produced. When dilute hydrochloric acid is flowed through the ion exchange column, the sodium ions on the resin react with the chloride ions to form sodium chloride. Only a small portion of the total acid flowed through the resin bed is actually used to convert the exchange resin to the hydrogen form. The remainder of the acid passes out of the bottom of the column along with the sodium chloride formed by the exchange. Excess acid is used since the concentration of hydrogen ions must be in excess of the sodium ions attached to the resin. If an excess of acid is not present, the point of equilibrium will be reached and all exchange ceases. However, when additional hydrogen ions are present in the form of excess acid passing through the column, the resin particles can be readily regenerated. So, in addition to the sodium chloride passing out the bottom of the column, hydrochloric acid which has not been reacted with sodium ions also will be flowing out of the column. When 10% hydrochloric acid is used, about 13% of the acid flowing through the column is consumed and the other 87% flows through the column in the form of hydrochloric acid along with the sodium chloride formed. Sulfuric acid is then added to the effluent coming out of the ion exchange columns in tank 29 and the resulting mixture is distilled in evaporators 31, 31 to give hydrochloric acid and sodium sulfate. A quantity of hydrochloric acid equal to the original volume flowed through the column in the regenerative step is recovered. The sodium sulfate formed by the addition of the sulfuric acid to the sodium chloride is readily used as a batch ingredient in glass making processes or the like. The hydrochloric acid may be very efficiently recovered by use of evaporators 31, 31 and a gas scrubber 32 and returned to the hydrochloric acid storage tanks, see FIGURE 1.

Sprinklers are advantageously used for introducing water, hydrochloric acid and sodium silicate to the ion exchange column. A retractable screen is preferably positioned within the column as indicated in the drawings but it may be removed or raised for inspection purposes. The influent is introduced upon this screen to prevent undue disturbance of the resin bed or the head of liquid above the resin.

Using the techniques of this invention, it is possible to use silicate of soda solutions of from 3 to 15%; however, it is preferred to use not more than 10% solids solution of sodium silicate since no sodium ion leakage occurs when 10% solids solution are used and furthermore no freezing of the resin bed is apt to occur.

The present invention makes it possible to produce 8% solids colloidal silicic acid which has heretofore been impossible. Virtual elimination of the danger of gelation of an ion exchange column has been accomplished by the use of a caustic back wash step in the cycle of operation of the ion exchange column. Improved stabilization of the silicic acid product has been provided by the introduction of both sodium and ammonium ions in the proper proportions relative to the colloidal silicic acid content.

Another method of carrying out the invention involves mixing the silicate salt solution with a suspension of a suitable resin without having the resin in the form of a bed in a base exchange column. For instance, one liter of an Amberlite IR-120 resin dispersion containing 745 grams of water and 459 grams of the dry resin were mixed in a suitable container by the action of a stirring device. Into the rapidly stirred mixture was introduced a mixture of sodium silicate comprising 465 grams of sodium silicate and 1,055 cc. of water. The sodium silicate used has a ratio of silicate to sodium oxide of 3.3:1 and comprises 37.7% solids. The sodium silicate mixture introduced into the Amberlite resin dispersion comprises 11.5% dry solids and the solution contained sufficient sodium silicate or sodium ions to saturate 86.7% of the total sodium absorbing acid groups on the resin.

The sodium silicate solution was run into the stirred resin dispersion at a rate such that the entire operation was completed within 8 minutes and in such a manner that the pH or hydrogen ion value of the mixture did not exceed a value of 3, i.e., the mixture was maintained on the acid side at all times. Local accumulation of alkali was prevented by the rapid stirring of the mixture. The pH at the start before any sodium silicate was added was 2.9 and after ⅛ of the sodium silicate was added, the pH was 2.6. At the end of adding ¼ of the sodium silicate solution, the pH was 2.7 and at the end of adding ½, it was 2.7. After having added ⅝ of the total salt solution, the pH was 2.8 and at the end of the addition of the solution, the pH was 3.0. With rapid stirring continuing, the pH fell to 2.7.

The silicic acid sol thus prepared was poured off from the resin after allowing the resin to settle and 1,500 cc. of a 7.3% solution of silicic acid was secured. This solution having a final pH of 2.7 was found to have a sodium content ($Na_2O$) of 0.00007 gram per cc. This amounts to 1 part of $Na_2O$ to 1,000 parts of $SiO_2$. Thus, the sodium content is negligible. The resin was then washed free of remaining entrained soluble silicic acid sol by washing the resin with water. No evidence of any coagulated silicic acid gel was found; however, the resin was then treated with sufficient 5% sodium hydroxide to cover the resin. The sodium hydroxide was allowed to remain on the resin for 5 minutes and then washed away with water and the resin was regenerated to the acid form by treating it for a short time with a 5 to 10% solution of hydrochloric or sulfuric acid. Excess free acid was then removed by washing the resin with water.

Higher concentrations of silicic acid have been prepared as follows. To 1,500 cc. of the 7.3% silicic acid sol prepared by the batch method were added 220 grams of undiluted sodium silicate of the same 1:3.3 ratio. The sodium silicate solution was added slowly to the sol while the sol was continuously agitated so as to avoid any local concentration of the sodium silicate. This is desirable; however, the first small portion of sodium silicate was added quickly so as to bring the pH to the 4 to 8 range and up into the highly alkaline range in a short length of time. It has been found desirable to partially dilute the sodium silicate solution before addition. The solution so prepared had a solids content of 14.2% of sodium silicate and silicic acid and had a pH of 10.4.

This solution was then fed into an agitated dispersion of regenerated resin recovered from the silicic acid sol preparation. The solution was added over a period of 14½ minutes as described in a manner such that the pH did not exceed 3 at any time. Thus, after adding ⅓ of the entire solution, the pH was 2.65 and after adding ⅔ of the entire solution, the pH was 2.65. The final pH of the solution obtained was 2.7. The silicic acid sol was produced was poured off the resin and 1,714 grams of solution was obtained. The product was 9.6% silicic acid. A sodium determination ($Na_2O$) of this solution gave 0.000023 gram per cc. which amounts to 1 part of $Na_2O$ to 5,000 parts of $SiO_2$. The solution was substantially free of alkali. It is possible to further concentrate the silicic acid sol by repeating the operation.

The silicic acid sols produced using the ion exchange column in a cyclic process were increased in strength likewise as follows. To an 8% silicic acid sol obtained in a cyclic process was added with rapid stirring a sodium silicate solution having 37.7% solids. The resulting mixture contained in addition to the silicic acid solids an added amount of sodium silicate so that the sodium silicate present in the entire mixture was increased to 10% by weight. The resulting fortified silicic acid contained 15.6% total solids.

The resin column used in preparing the original silicic acid was regenerated in the usual manner by washing with water, then with 5% sodium hydroxide, again with water and then with 10% hydrochloric acid followed by a water wash. To the regenerated column was added the fortified silicic acid sol containing the fresh sodium silicate. This mixture flowed through the column without any difficulty although the viscosity had been raised slightly. The initial influent in the first step of the operations had a viscosity of 4.0 whereas this fortified second influent was found to have a viscosity of 5.8 centipoises. The effluent from the column was collected and the silicic acid sol secured was found to have a solids content of 10.6%. The product was found to be substantially free of sodium ions. The column was then regenerated once more and to the silicic acid sol of 10.6% silicic acid solids was added sodium silicate to provide a 10% solids sodium silicate solution having a total actual solids of 17.8%. This fortified silicic acid was recycled for the third time. The feed liquor which was recycled was found to have the same viscosity as above, i.e., 5.8 centipoises. The product collected after the third pass was a silicic acid sol having 13.35% silicic acid solids. The pH values ranged between 2 and 3, the silicic acid sol being collected remaining always on the acid side. The pH values of the finally collected effluent dropped slightly upon successive rerunning due to the accumulation of hydrochloric and sulfuric acids produced from a small amount of salt contaminates and initial sodium silicate.

Figure 13:
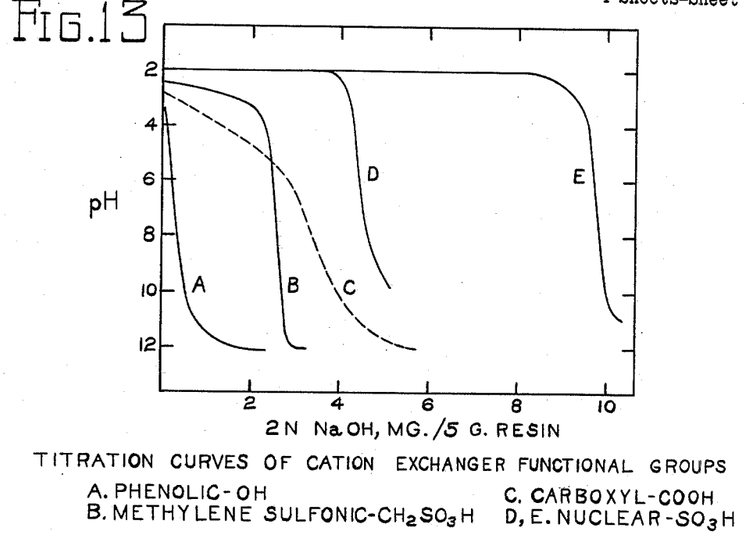
FIGURE 13 shows titration curves of various cation exchanger functional groups.
Figure 14:
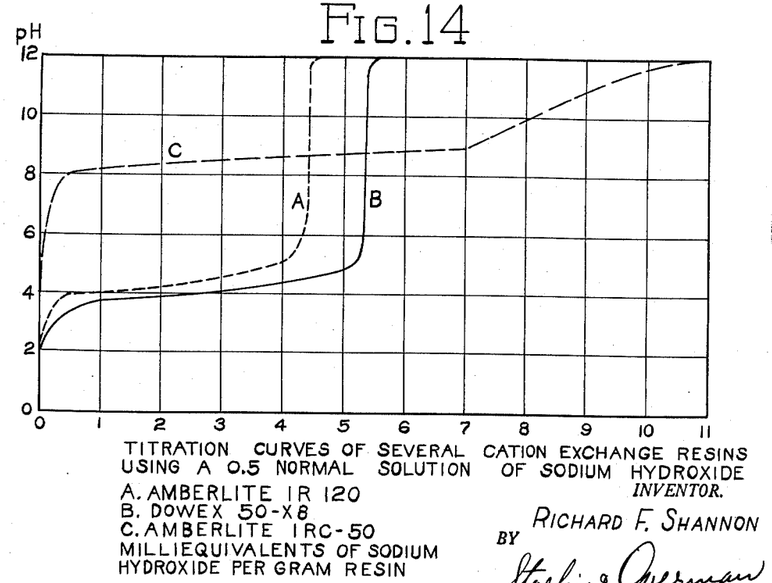
FIGURE 14 shows titration curves of certain cation exchange resins.

As stated previously, the selection of the proper ion exchange resin is an important feature of this invention. As shown in FIGURES 13 and 14, not all resins have the same characteristics. Ion exchange resins in which the acid groups present are substantially only of a carboxylic or phenolic type or mixtures of these groups such as an Amberlite IRC–50 and Amberlite IR–1, are generally not useful in this invention. The curves shown in FIGURE 13 are taken from an article by Thompkins, published in the Journal of Analytical Chemistry, volume 22, pages 1352 and 1353 in 1950. In FIGURE 13 are curves representing resins having various groupings in their make-up. The curves represent changes in pH or hydrogen ion value when NaOH is added to various resins having particular organic acid groups on their surfaces. It is noted that the aryl or nuclear sulfonic acid groupings represented by curves D and E show no particular change in pH and remain highly acid until these groups are almost completely saturated by the alkali used in the titration. It will be further noted that these acids are extremely strong and practically equal to sulfuric acid in strength even though they are an insoluble acid resin. Because of the strength of the acid groups of the resin, the pH during the saturation of the acid groups remains less than 4. Thus, partial neutralization of such strong acid residues by sodium silicate similarly has been found by tests to maintain the mixtures at pH values below 4 at which pH silicic acid sols are found to be stable.

Resins having phenolic groups or carboxylic groups such as those represented by curves A and C are not suitable for the purposes of this invention since they do not provide any appreciable neutralizing ability at pH values less than 4. These resin groups are neutralized with an attendant immediate rise in pH so that the pH goes to values of 7 and greater. When alkali is added to resin acids such as Amberlite IR–1, the pH immediately rises into regions just above 4, where silicic acid is unstable or it rises to pH values of 8 or above.

In FIGURE 14 is shown a pH titration curve of 3 ion exchange resins, Amberlite IR–120, Dowex 50–X8, and Amberlite IRC–50. The first two of these resins (curves A and B) are suitable for use in the processes of this invention and are nuclear sulfonic acid materials. The third resin (curve C) is unsuitable for use and is a carboxylic acid type material. It will be seen that the latter has practically no combining activity below a pH of 8. By using Amberlite IR–120 or Dowex 50–X8 and stopping the reaction at about 90% of the complete combining power of these resins, stable acidic silicic acid sols are produced at pH values below 4.

These titration curves of sodium silicate can be used as a basis of predetermining the commercial operations of forming silicic acid either in a column or in a batch operation as has been described. Analytical methods and flame photometer methods on the silicic acid produced show a complete absence of sodium, calcium, magnesium, and aluminum ions and it is a characteristic of the products produced by this invention that they are substantially free of all cations.

When an ion exchange column is being used, the rate at which a sodium silicate solution and an alkali silicate solution are passed downwardly through the column is preferably maintained at a rate of approximately ½ gallon per minute per square foot of cross section. This rate is somewhat less than that normally employed in treatment of water where it is common to run at one or more gallons per unit of area. This is preferred so there will be no tendency for untreated silicate to channel around or leak past the ion exchange resin without complete treatment.

Various modifications may be made within the spirit and scope of the appended claims.

I claim:

1. Stable colloidal silicic acid for application to alkali sensitive materials, the silicic acid having a solids content of at least 8% and a pH of at least 10 and containing about 1 part of sodium and 3 parts of ammonia per 100 parts of colloidal silicic acid, said sodium and ammonia providing extended shelf-life.

2. Colloidal silicic acid for use upon alkali sensitive materials containing from 1 to 4 parts by weight of sodium and from 1 to 12 parts by weight of ammonia per 100 parts by weight of colloidal silicic acid as a stabilizer.

3. In a process of producing stable colloidal silicic acid suitable for application to glass fibers as a surface treatment, the improvement comprising rapidly adjusting the pH of the colloidal silicic acid from about 2–3 to about 8–11 to prevent gelation, the adjustment being made by simultaneous addition of an alkali metal hydroxide and ammonium hydroxide accompanied by rapid stirring, said alkali metal hydroxide being added in amounts such that the alkali metal will be less than 1% by weight of the stabilized colloidal silicic acid product.

4. In a process of producing stable colloidal silicic acid for use as a surface treatment for glass fibers, the steps comprising the simultaneous addition of sodium ions in sufficient amount to obtain 1 part of sodium per 100 parts of colloidal silicic acid and ammonia in sufficient amount to obtain 3 parts of ammonia per 100 parts of colloidal silicic acid accompanied by rapid stirring to stabilize the colloidal silicic acid and provide extended shelf-life.

5. In a process of producing stable colloidal silicic acid suitable for use as a surface treatment for glass fibers, the improvement comprising simultaneous addition of the hydroxides of sodium and ammonium to the colloidal silicic acid accompanied by rapid stirring, the hydroxides of sodium and ammonium being added in sufficient quantity to provide 1 part of sodium and 3 parts of ammonium per 100 parts of colloidal silicic acid to stabilize the colloidal silicic acid and provide extended shelf-life.

6. In a process of producing stable colloidal silicic acid suitable for use upon glass fibers as a surface treatment comprising passing sodium silicate solution through a hydrogen ion exchange column, the improvement consisting of simultaneously adding to the colloidal silicic acid having a pH of from about 2–3, sodium ions in sufficient amount to obtain about 1 part of sodium per 100 parts of silicic acid and ammonium ions as ammonia in sufficient amount to adjust rapidly the pH of the colloidal silicic acid to from about 8–11 to stabilize the colloidal silicic acid and thereby provide long shelf-life, the simultaneous addition of the two stabilizing ions being accompanied by rapid stirring.

References Cited in the file of this patent

UNITED STATES PATENTS

| | | |
|---|---|---|
| 2,573,743 | Trail | Nov. 6, 1951 |
| 2,689,229 | Kimberlin et al. | Sept. 14, 1954 |
| 2,692,244 | Kunin et al. | Oct. 19, 1954 |
| 2,858,277 | Hunter | Oct. 28, 1958 |